United States Patent
Lang et al.

(10) Patent No.: US 7,342,484 B2
(45) Date of Patent: Mar. 11, 2008

(54) EXTERIOR VEHICLE MIRROR ASSEMBLY WITH SENSORS

(75) Inventors: Heinrich Lang, Ergersheim (DE); Michael Witzke, Ansbach (DE); Jörg Scholler, Ergersheim (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 201 days.

(21) Appl. No.: 11/085,871

(22) Filed: Mar. 22, 2005

(65) Prior Publication Data

US 2005/0242934 A1 Nov. 3, 2005

(51) Int. Cl.
*B60R 25/10* (2006.01)

(52) U.S. Cl. ............................ 340/426.26; 340/426.25; 348/154; 348/155

(58) Field of Classification Search ............. 340/932.2, 340/435, 426.1, 426.24–26, 426.26; 359/844; 348/148, 154, 155
See application file for complete search history.

(56) References Cited

U.S. PATENT DOCUMENTS 5,680,123 A * 10/1997 Lee ............................. 340/937
5,963,127 A * 10/1999 Lang et al. ................. 340/436

FOREIGN PATENT DOCUMENTS

| DE | 296 17 413 U1 | 1/1997 |
| DE | 198 08 181 A1 | 9/1999 |
| DE | 199 04 778 C2 | 4/2001 |
| DE | 100 61 781 A1 | 3/2002 |
| DE | 100 62 655 A1 | 7/2002 |
| DE | 699 04 979 T2 | 11/2003 |

* cited by examiner

*Primary Examiner*—Davetta W. Goins
*Assistant Examiner*—Hongmin Fan
(74) *Attorney, Agent, or Firm*—McNair Law Firm, P.A.

(57) ABSTRACT

An exterior mirror sensor system for commercial vehicles comprising an exterior mirror, a sensor for monitoring an exterior mirror zone, and an indicator for indicating objects detected in the exterior mirror zone. The sensor may be a distance sensor, a motion sensor or a heat sensor. The system may further comprise a control unit connected to the sensor and indicator for controlling the indicator. The system may further comprise a camera for recording objects in the exterior mirror zone. The control unit may actuate the indicator upon the detection of an object by the sensor. The indicator may comprise an audible indicator. The system may further comprise a data input unit for recording data detected by the sensor wherein the data input unit is connected to the control unit and receives the data detected by the sensor from the control unit.

14 Claims, 4 Drawing Sheets

EXTERIOR VEHICLE MIRROR ASSEMBLY WITH SENSORS

FIELD OF THE INVENTION

The present invention relates to an exterior mirror assembly for commercial vehicles, in particular for trucks or busses.

BACKGROUND OF THE INVENTION

In commercial vehicles, particularly for busses, highly visible mirror designs are used. These mirror structures protrude far forward a top portion of a commercial vehicle body. These mirrors have been called "horn" or "L-shaped" mirrors because of their appearance.

These mirror assemblies typically include an L-shaped mirror housing and a mirror support mount disposed at a second free end. The mirror housing is approximately vertical when attached to the commercial vehicle and points with the first free end downward towards the road surface. The mirror support mount is approximately horizontal in the mounted state and may be mounted by the second free end to a mirror support mount affixed to the vehicle.

Since these mirrors extend beyond the windshield and thereby beyond the forward end of the vehicle, they are greatly at risk of damage due to impact. In addition, these mirrors are often stolen due to the value of the mirrors and the attachment of the mirror.

It would be advantageous to further develop the existing mirror assemblies so that the risk of damage and of theft is reduced.

SUMMARY OF THE INVENTION

The invention is an exterior vehicle mirror assembly sensor system for commercial vehicles which provides damage and theft protection. The assembly comprises an overhead exterior mirror carried by a commercial vehicle and a sensor carried by the exterior mirror for monitoring objects within an exterior mirror zone surrounding the exterior mirror and generating sensor signals in response to the detection of an object in the exterior mirror zone. A control unit receives the sensor signals and transmits fault signals to an associated indicator. An electrical coupling member may be disposed between the exterior mirror and the vehicle for electrically connecting the sensor to the control unit. An indicator notifies individuals of any objects detected in the exterior mirror zone by the sensor. The exterior mirror comprises a mirror support mount carried by the vehicle and attached to the coupling member and a mirror housing connected to the mirror support mount. The mirror housing may extend generally vertically downward while carried by the vehicle. The sensor is carried by the mirror housing of the exterior mirror. The sensor may be a distance sensor for detecting the distance of an object in the exterior mirror zone for use as a damage prevention aide. The sensor may be a motion sensor, for detecting motion in the exterior mirror zone for use as a theft deterrent. The sensor may be a heat sensor for detecting heat in the exterior mirror zone for use as a theft deterrent. The system may further include a camera carried by the mirror. The camera is in communication with the control unit for recording objects in the exterior mirror zone. The control unit actuates the indicator upon receiving a fault signal representing the detection of an object by the sensor. The system may include a light source carried by the exterior mirror. The light source is connected to the control unit for actuation by the control unit upon the detection of an object by the sensor. The system may include a data input unit for recording data detected by the sensor. The data input unit is connected to the control unit and receives the data detected by the sensor from the control unit. The indicator may be an audible indicator for audibly indicating the detection of an object by the sensor. The indicator may be an optical output for optically indicating the detection of an object by the sensor. The electrical coupling is detachably connected to the mirror head.

The invention is a sensor system for detecting objects around a commercial vehicle's exterior mirror. The system contains a sensor carried by an exterior mirror for detecting objects in an exterior mirror zone surrounding the exterior mirror and generates a trigger signal upon detecting an object in the exterior mirror zone. The system also includes an indicator in electronic communication with the sensor for receiving the trigger signal and indicating that the signal has been received. The sensor system may also include an electronic coupling member disposed between the sensor and the vehicle for electrically connecting the sensor to the vehicle. The sensor can be at least one selected from a group consisting of a motion sensor for detecting motion of objects, a distance sensor for detecting the proximity of objects in the exterior mirror zone, a heat sensor for detecting heat from objects in the exterior mirror zone, and a video camera for optically detecting objects in the exterior mirror zone. The sensor system may include a data input unit connected to the sensor for receiving the trigger signal from the sensor and storing the trigger signal from the sensor representing the detection of an object by the sensor. The sensor system may further include a light source carried by the exterior mirror. The light source is in electronic communication with the sensor for actuation upon detection of an object in the exterior mirror zone. The indicator comprises at least one selected from the group consisting of from an optical indicator or an audible indicator, or can be both.

This invention is also a method for damage and theft protection of exterior vehicle mirrors using sensors. The method contains the steps of monitoring the exterior mirror zone representing the area surrounding the exterior mirror with at least one sensor, determining if an object is detected in the exterior mirror zone by the sensor, and indicating on an associated indicator the detection of an object in the exterior mirror zone.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DETAILED DESCRIPTION OF A PREFERRED EMBODIMENT OF THE INVENTION

Figure 1:
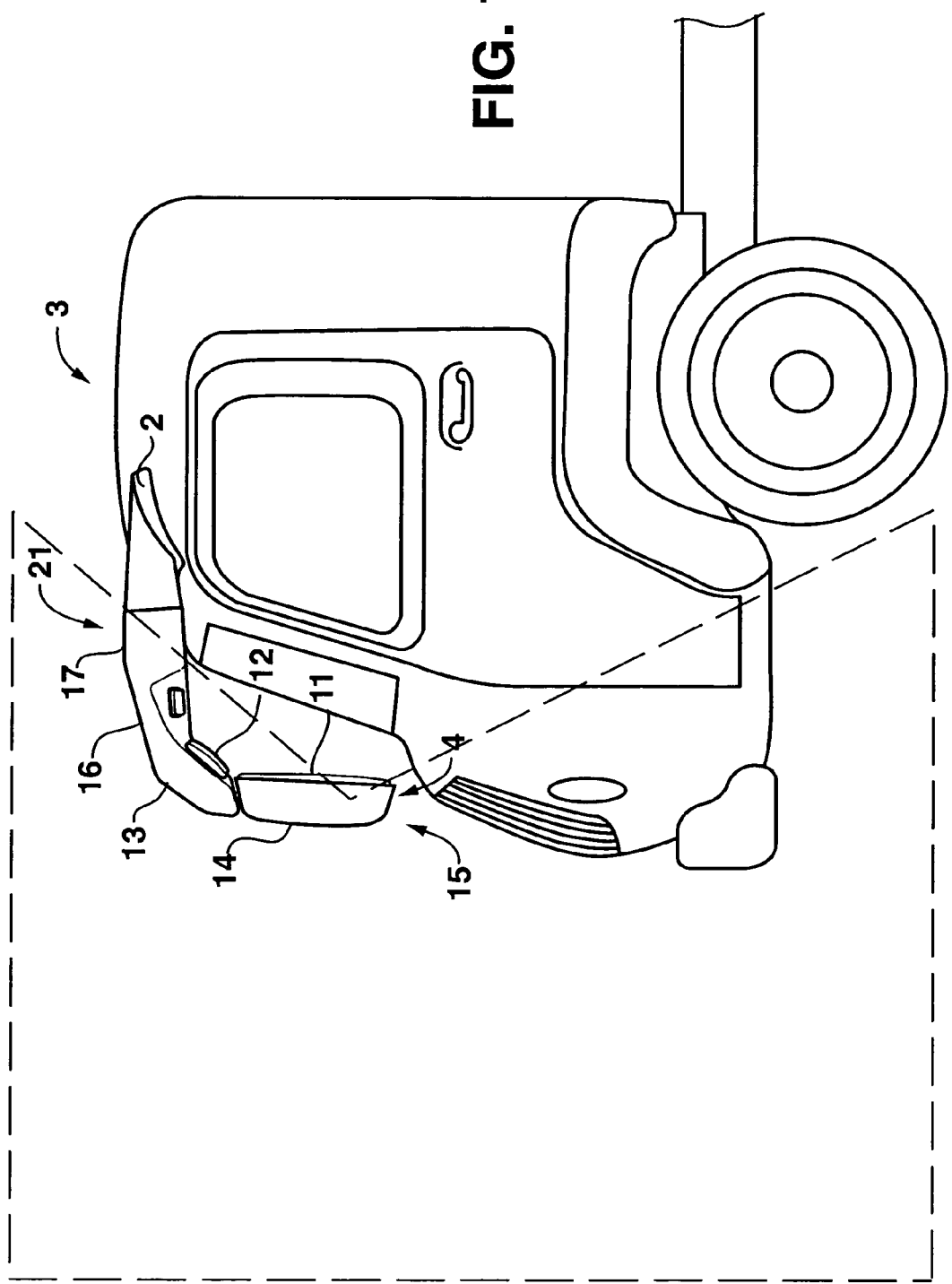
FIG. 1 is a side elevation illustrating an exterior mirror assembly according to the present invention attached to an associated commercial vehicle.

The mirror assembly shown generally in FIGS. 1-4 comprises a mirror assembly 1 with two mirror panes 11 and 12 installed in a housing and capable of being adjusted. Mirror pane 11 may be a main mirror and mirror pane 12 may be a wide-angle mirror. The mirror head assembly 1 is generally L-shaped and includes a mirror head, shown generally as 14, and a mirror foot, shown generally as 16. Mirror head assembly 1 has a first free end 15 and a second free end 17. The mirror head 14 is nearly vertical in its mounted state and points with its free end 15 downward to the road surface. The mirror foot 16 is nearly horizontal in its mounted state. Mirror foot 16 may be mounted by its free end 17 via a coupling unit 21 to a support mount 2. In a further embodiment, the mirror may be mounted in a detachable manner. The mirror support mount 2 is attached to a driver cab 3 of a vehicle.

Figure 2:
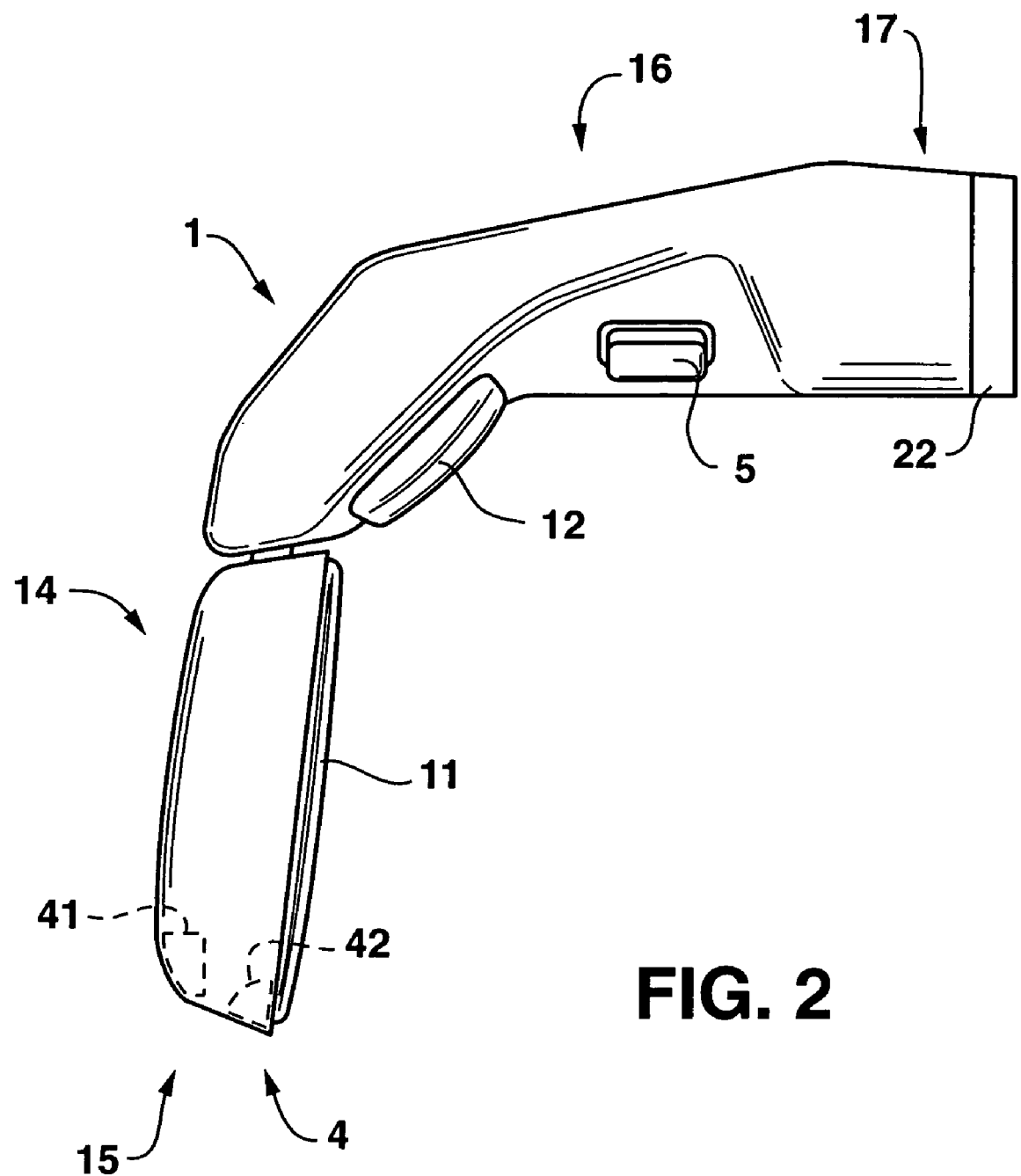
FIG. 2 is a side elevation illustrating detail of the exterior mirror assembly.

As can best be seen in FIG. 2, a sensor assembly is illustrated as including a sensor arrangement, designated generally at 4, carried near first free end 15 within mirror head 14. Sensor arrangement 4 is integrated into the mirror head assembly, shown generally as 1. Sensor arrangement 4 may be one or more of a distance sensor 41, a motion sensor 42, a heat sensor 44, and a camera 43. Sensor arrangement 4 can be, in the case of a distance sensor, a damage and injury prevention aide. In the case of a motion sensor, sensor arrangement 4 is an antitheft aide. A light source 5 directed downward is integrated into the mirror head assembly 1 in the mirror foot 16. The light source may be used by the system as an antithieft aide.

Depending on the desired result, one or more of the sensors may be used for the monitoring of the mirror's surroundings. For example, distance sensors, motion sensors, cameras and heat sensors may be used in any combination. Distance sensors detect the distance of obstacles, in particular in front of the vehicle. Distance sensors are useful in protecting the exterior mirror from damage while the vehicle is in operation. This operation is discussed more fully below. When the vehicle is parked, motion and heat sensors can detect persons who may touch the mirrors or the vehicle in general in an unauthorized manner. Cameras, which may be connected to a recording unit, can record such activities.

Referring now to FIG. 2, distance sensor 41 may detect objects within a certain distance of the exterior mirror when the vehicle is traveling. Once an object has come within that certain distance within the exterior mirror zone, the sensor transmits a trigger signal 75 indicating the presence of the object. The trigger signal is sent to the indicator. The trigger signal activates the indicator, thus indicating the presence of an object in the exterior mirror zone. In a further embodiment, the trigger signal is transmitted to a control unit 6 which processes and transmits signals 76a, 76b, and 76c to the indicators. Each of these signals may actuate the indicator. As stated above, the indicator is at least one of an audible indicator and optical indicator. An audible alarm audibly indicates to the driver of the vehicle the presence of an object in the exterior mirror zone. The audible alarm may be any type of indication capable of being heard.

The area around the mirror assembly, i.e. in particular the area in front of, behind, laterally to and below the mirror assembly is monitored for obstacles or general objects. This area, described above and shown generally in FIGS. 1 and 4, is known as the exterior mirror zone. This sensor installation makes it possible to recognize obstacles appearing in the area around the mirror, so that the driver can react before damage is inflicted on the mirror assembly.

During the vehicle operation, if an obstacle capable of damaging the mirror assembly appears In the exterior mirror zone the distance sensor will detect the object. The exterior mirror zone may include an area of at least two feet around the mirror. The exterior zone may include the short distance in front of the vehicle in course of travel. If an object is detected by the distance sensor 41, a warning message is emitted for the driver via an indicator. The indicator is at least one of an optical or audible indicator. These indicators may include at least one of loudspeaker 72 and the monitor 71 to emit a warning message, audibly and visually.

In addition to the protection from objects while the vehicle is traveling, the sensor arrangement may protect the mirror from theft or damage while parked. When the vehicle is parked, this sensor arrangement makes it possible to detect objects and persons moving in the area around the mirror. By emitting an alarm signal, theft can be prevented. The alarm signal may be optical or acoustical. The alarm signal may address the driver by means of a suitable display inside the vehicle or in combination with the vehicle horn or light so as to scare off any potential thief. While the vehicle is parked, the area around the mirror assembly is monitored by suitable sensors to sense the presence of a person or object into a prescribed zone. The sensors include motion sensor 42 and heat sensor 44. If a person comes too close to the mirror assembly and detected by motion sensor 42, the light source 5 is actuated by the control unit 6. If the person remains within monitoring range, the vehicle horn is actuated. Potential thieves can be discouraged to a certain degree by these measures.

In addition to the motion sensor, a heat sensor or other sensor may be used to detect objects in the form of potential thieves of the mirror. A motion sensor detects any movement in the exterior mirror zone as described above. Continued movement in the exterior mirror zone may indicate an attempt to steal the mirror. A heat sensor detects the presence of a heat source near the sensor, in this example, in the exterior mirror zone. The presence of a heat source in the exterior mirror zone may indicate the presence of an individual near the mirror. The person's continued presence may indicate an attempt to steal the mirror. Light source 5 is included in the exterior mirror, and may be actuated upon the detection of persons in the vicinity of the mirror assembly by a heat sensor. Thereby potential thieves can also be discouraged.

Figure 3:
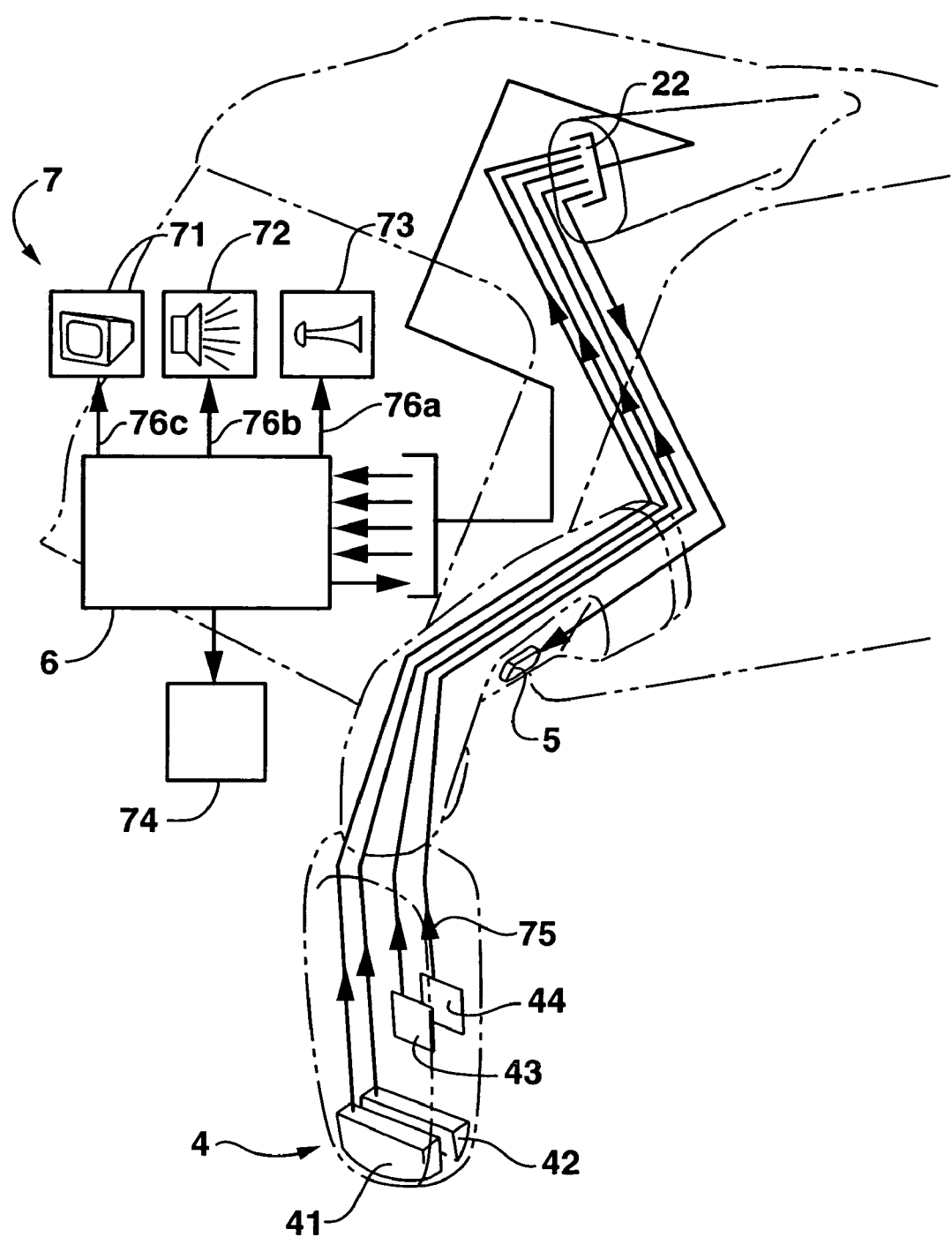
FIG. 3 is a block diagram illustrating the sensor and control components of the invention.

FIG. 3 shows a block diagram of the sensor and control components of the invention. Multiple sensors are shown in FIG. 3 including distance sensor 41 and motion sensor 42 and heat sensor 44. Further, camera 43 is shown as being installed in the mirror head of the exterior mirror. Each of the sensors, including the camera, are connected to control unit 6 via electrical coupling element 22.

In operation, both while traveling and while the vehicle is parked, if the sensors detects an object in the exterior mirror zone, the sensor sends an electrical trigger signal to control unit 6. Control unit 6 actuates an indicator representing the trigger signal sent by one of the sensors. This indicator is at least one from a group of light source 5, loudspeaker 72, horn 73, display 71. Upon receiving a trigger signal from the sensor, control unit 6 actuates at least one of the above listed indicators. For example, while the vehicle is in operation, monitor 71 may display an optical notification that an object has been detected by one of the distance sensors. Loudspeaker 72 and horn 73 may provide an audible indication that an object has been detected as an antitheft measure. In a further embodiment, loudspeaker 72 and display 71 may be used to indicate detection of an object by a distance sensor. Horn 73 and light source 5 are used in a further embodiment to indicate an object that has been detected by at least one of heat sensor 44, motion sensor 42, and camera 43 as a theft prevention aide. Control unit 6 actuates light source 5 if an object is detected by the heat or distance sensors while the vehicle has been parked. In a further embodiment, if an object is detected while the vehicle is parked for an extended period of time, horn 73 is actuated in addition to light source 5 being actuated in order to provide a further theft deterrent. In a further embodiment, data input unit 74 can receive input from control unit 6 representing information about trigger signals that have been sent by any of the sensors. Thus, data input unit 74 stores information relating to all sensor activity including trigger signals being sent by sensors representing the detection of an object in the exterior mirror zone, both while the vehicle is moving and parked.

Figure 4:
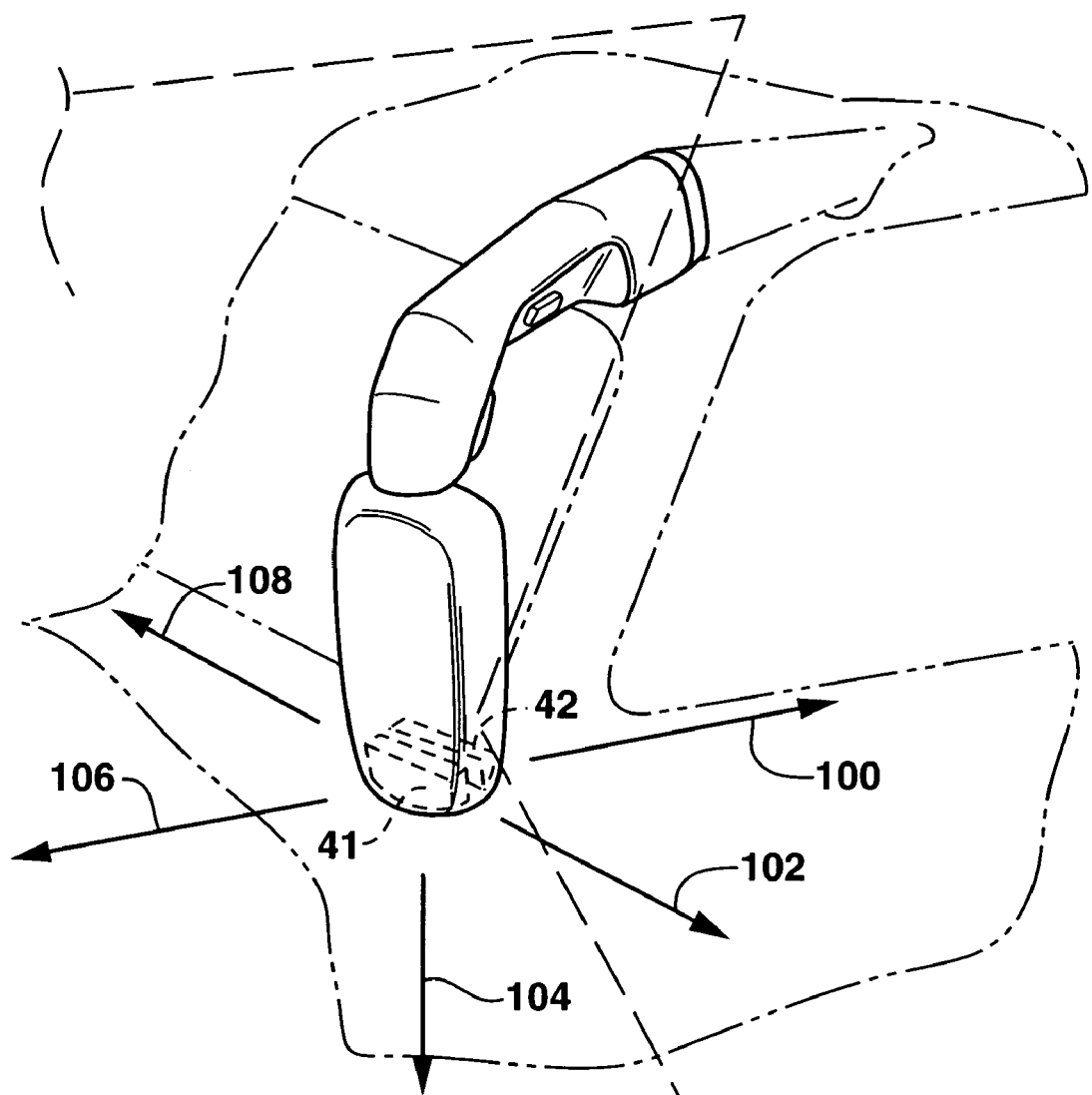
FIG. 4 is a perspective view illustrating the exterior mirror assembly installed on an associated commercial vehicle according to the invention.

As can best be seen in FIG. 4, a portion of the exterior mirror zone is shown. Lines 100 indicate a portion of the zone behind the exterior mirror that can be detected by sensor 41 or 42. Line 106 indicates a portion of the zone in front of the exterior mirror that can be detected by sensor 41 or 42. Lines 102 and 108 indicate portions of the exterior mirror zone on both the left and right of the exterior mirror. Line 104 indicates at least a portion of the exterior mirror zone below the mirror that can be detected by sensor 41 and 42. FIG. 1 also illustrates a portion of the exterior mirror zone.

The preceding description is for example purposes only and in no way limits the scope of the following claims.

What is claimed is:

1. An exterior vehicle mirror assembly sensor system for a commercial vehicle which operates when the vehicle is stationary and moving to provide damage and theft protection, said assembly comprising:

an overhead exterior mirror assembly carried by said commercial vehicle including a mirror foot and a mirror head;

a plurality of sensors carried by said mirror head for monitoring objects within an exterior mirror zone surrounding said exterior mirror assembly comprising monitoring in left, right, front, back and down directions and generating identifiable sensor signals in response to the position of an object in the exterior mirror zone;

a control unit connected to said sensors receiving and identifying said sensor signals; and a plurality of indicators responsive to said control unit; wherein, said control unit receives and identifies a signal from said sensors sent when said vehicle is moving and stationary and activates an appropriate indicator for notifying individuals of an object detected in the exterior mirror zone by a selected of said sensors.

2. The system of claim 1, wherein said exterior mirror assembly comprises:

a mirror support mount carried by said vehicle and attached to a coupling member; and said mirror head connected to said mirror support mount extending generally vertically downward while carried by said vehicle.

3. The system of claim 1, wherein said sensors are carried by said mirror head of said exterior mirror assembly.

4. The system of claim 1, wherein said sensors comprise a distance sensor for detecting the distance of an object in the exterior mirror zone for use as a damage prevention aide.

5. The system of claim 1, wherein said sensors comprise a motion sensor, for detecting motion in the exterior mirror zone for use as a theft deterrent.

6. The system of claim 1, wherein said sensors comprise a heat sensor, for detecting heat in the exterior mirror zone for use as a theft deterrent.

7. The system of claim 1, further comprising a camera carried by said exterior mirror assembly, in communication with said control unit for recording objects in said exterior mirror zone.

8. The system of claim 1, wherein said control unit actuates said indicator upon receiving a sensor signal representing the detection of an object by said sensor.

9. The system of claim 1, further comprising a light source carded by said mirror head assembly connected to said control unit for actuation by said control unit upon the detection of an object by a sensor of said sensors.

10. The system of claim 1, further comprising a data input unit for recording information representing the detection of an object by said sensor wherein said data input unit is connected to said control unit and receives the information representing the detection of an object from said control unit.

11. The system of claim 1, wherein said indicator comprises an audible indicator for audibly indicating the detection of an object by a sensor of said sensors.

12. The system of claim 1, wherein said indicator comprises an optical output for optically indicating the detection of an object by a sensor of said sensors.

13. The sensor system of claim 1 further comprising:

a detachable electrical coupling element disposed between said mirror assembly and the vehicle for electrically connecting said sensors to said control unit.

14. A method of protecting an exterior mirror assembly from damage or theft including:

providing a mirror assembly including a mirror head and a mirror foot and mounting said mirror assembly with a vehicle;

providing a monitoring system, including a plurality of sensors, a plurality of indicators, and a control, and causing each of said sensors to continuously monitor for a designated intrusion within an exterior mirror zone representing an area surrounding said exterior mirror assembly when the vehicle is moving and stationary; wherein, said monitoring system operates to detect and identify an intrusion into said area, to select the indicator appmpriate of said plurality of indicators and to actuate said selected indicator.

* * * * *